United States Patent
Yanada

(10) Patent No.: US 8,175,450 B2
(45) Date of Patent: May 8, 2012

(54) FOCAL POINT DETECTION DEVICE AND CAMERA SYSTEM

(75) Inventor: Takashi Yanada, Tokyo (JP)

(73) Assignee: Olympus Corporation, Tokyo (JP)

( * ) Notice: Subject to any disclaimer, the term of this patent is extended or adjusted under 35 U.S.C. 154(b) by 189 days.

(21) Appl. No.: 12/565,427

(22) Filed: Sep. 23, 2009

(65) Prior Publication Data

US 2010/0080547 A1  Apr. 1, 2010

(30) Foreign Application Priority Data

Sep. 26, 2008 (JP) ................. 2008-248749

(51) Int. Cl.
   *G03B 13/34* (2006.01)
(52) U.S. Cl. ........................ 396/101; 348/349
(58) Field of Classification Search ............ 396/101; 348/349

See application file for complete search history.

(56) References Cited

U.S. PATENT DOCUMENTS

| | | | | |
|---|---|---|---|---|
| 4,567,510 A | * | 1/1986 | Tanaka et al. | 348/273 |
| 4,615,598 A | * | 10/1986 | Koshiishi | 396/125 |
| 5,144,450 A | * | 9/1992 | Kikuchi et al. | 348/347 |
| 6,847,402 B2 | | 1/2005 | Sugimoto et al. | |
| 7,102,681 B1 | * | 9/2006 | Kashiyama | 348/353 |
| 2003/0189660 A1 | * | 10/2003 | Ishida et al. | 348/312 |

FOREIGN PATENT DOCUMENTS

JP 2001-255450 A 9/2001

* cited by examiner

*Primary Examiner* — Christopher Mahoney
*Assistant Examiner* — Fang-Chi Chang
(74) *Attorney, Agent, or Firm* — Westerman, Hattori, Daniels & Adrian, LLP

(57) ABSTRACT

A focal point detection device includes: a rate conversion section which converts a transmission rate of an image signal, which is associated with a subject image imaged via an imaging lens on a part of a receiving surface of an imaging device, such that the image signal input to the rate conversion section at a first transmission rate is output from the rate conversion section at a second transmission rate that is slower than the first transmission rate; a filter which extracts a frequency component from the image signal output at the second transmission rate from the rate conversion section; and an evaluation value calculation section which calculates an evaluation value of a focus state of the imaging lens, based on a signal of the frequency component that is extracted by the filter.

1 Claim, 9 Drawing Sheets

| R0 | Gr0 | R1 | Gr1 | R2 | Gr2 | R3 |
|----|-----|----|-----|----|-----|-----|
| Gb0 | B0 | Gb1 | B1 | Gb2 | B2 | Gb3 |
| R0 | Gr0 | R1 | Gr1 | R2 | Gr2 | R3 |
| Gb0 | B0 | Gb1 | B1 | Gb2 | B2 | Gb3 |

FOCAL POINT DETECTION DEVICE AND CAMERA SYSTEM

BACKGROUND OF THE INVENTION

1. Field of the Invention

The present invention relates to a focal point detection device for detecting a focus state of an imaging lens. Furthermore, the present invention also relates to a camera system furnished with the focal point detection device.

Priority is claimed on Japanese Patent Application No. 2008-248749, filed Sep. 26, 2008, the content of which is incorporated herein by reference.

2. Description of Related Art

Cameras that perform auto-focus (referred to hereunder as AF) processing, in which the focus state of an imaging lens is detected and corrected automatically such that it becomes focused, have become mainstream (for example, refer to Japanese Unexamined Patent Application, First Publication No. 2001-255450). In AF processing, firstly, processing using a high pass filter (referred to hereunder as HPF) is performed on an image signal output from an imaging device. Subsequently, integrated processing is performed on each of a plurality of regions obtained by dividing a single-field image, and an AF evaluation value is calculated for each region. In the case where the imaging lens is not focused, since the obtained image is blurred, the AF evaluation values are low. Furthermore, in the case where the imaging lens is focused, since edges appear in the obtained image, the AF evaluation values are high. Based on the AF evaluation values obtained as described above, the location of the imaging lens is controlled by hill climbing control system or the like, for example, such that the AF evaluation value in a desired region reaches a maximum.

Normally, an IIR (Infinite Impulse Response) filter is used for the HPF. This is because it contains a feedback group, and hence excellent characteristics can be obtained in low order compared with a FIR (Finite Impulse Response) filter. In the case where the HPF is formed using an IIR filter, a multiplier or an adder incorporated in the feedback loop of the IIR filter has to process an image signal within one clock cycle.

SUMMARY OF THE INVENTION

A focal point detection device of a first aspect of the present invention includes: a rate conversion section which converts a transmission rate of an image signal, which is associated with a subject image imaged via an imaging lens on a part of a receiving surface of an imaging device, such that the image signal input to the rate conversion section at a first transmission rate is output from the rate conversion section at a second transmission rate that is slower than the first transmission rate; a filter which extracts a frequency component from the image signal output at the second transmission rate from the rate conversion section; and an evaluation value calculation section which calculates an evaluation value of a focus state of the imaging lens, based on a signal of the frequency component that is extracted by the filter.

A focal point detection device of a second aspect of the present invention includes: a decimation section that outputs a second image signal in which a part from a first image signal associated with a subject image imaged via an imaging lens on a receiving surface of an imaging device is eliminated; a filter which extracts a frequency component from the second image signal output from the decimation section; and an evaluation value calculation section which calculates an evaluation value of a focus state of the imaging lens, based on a signal of the frequency component that is extracted by the filter.

A camera system of an aspect of the present invention includes: an imaging lens which images a subject image on a light receiving surface of an imaging device; the focal point detection device of the first aspect; the focal point detection device of the second aspect; a selection section which selects either one of the two focal point detection devices; and a lens driving section which drives the imaging lens so as to adjust a focal position, based on the evaluation value output from the selected focal point detection device.

DETAILED DESCRIPTION OF THE INVENTION

Hereinbelow, embodiments of the present invention will be described with reference to the drawings.

<First Embodiment>

Figure 1:
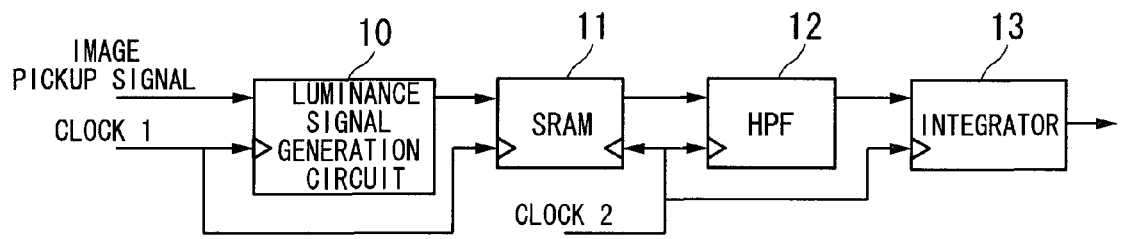
FIG. 1 is a block diagram showing the structure of a focal point detection device according to a first embodiment of the present invention.

A first embodiment of the present invention will be described. FIG. 1 shows the structure of a focal point detection device according to the present embodiment. As shown in FIG. 1, the focal point detection device is provided with a luminance signal generation circuit 10, a SRAM (Static Random Access Memory) 11, an HPF (high pass filter) 12, and an integrator 13.

An image pickup signal associated with a subject image imaged on a light receiving surface of an imaging device via an imaging lens is input to the luminance signal generation circuit 10. Furthermore, a clock 1 is input to the luminance signal generation circuit 10, and the image pickup signal is input to the luminance signal generation circuit 10 at a transmission rate defined by the clock 1. The luminance signal generation circuit 10 generates a luminance signal (image signal) from the input image pickup signal, and outputs it.

The clock 1 is input to the SRAM 11, and the luminance signal output from the luminance signal generation circuit 10 is input to the SRAM 11 at the transmission rate defined by the clock 1. The SRAM 11 temporarily stores the input luminance signal. Moreover, a clock 2 is input to the SRAM 11, and the luminance signal stored in the SRAM 11 is output from the SRAM 11 at a transmission rate defined by the clock 2. Clock 2 is slower than clock 1 (in other words, clock 1 is faster than clock 2), so the transmission rate of the luminance signal is converted to a lower transmission rate by the SRAM 11.

Clock 2 is input to the HPF 12, and the luminance signal output from the SRAM 11 is input to the HPF 12 at the transmission rate defined by clock 2. The HPF 12 extracts a predetermined frequency component from the luminance signal, and outputs it. Clock 2 is input to the integrator 13, and the luminance signal output from the HPF 12 is input to the integrator 13 at the transmission rate defined by clock 2. The integrator 13 integrates a signal of the frequency component extracted by the HPF 12, and calculates an evaluation value of a focus state of the imaging lens.

Figure 2:
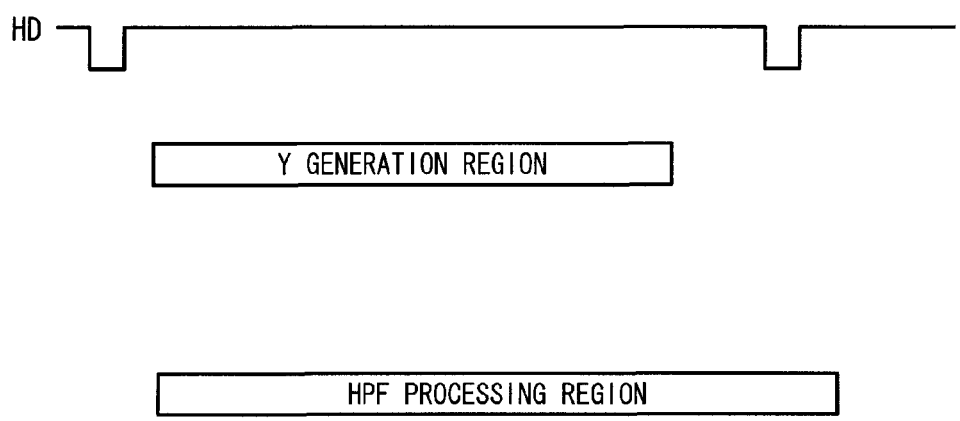
FIG. 2 is a timing chart showing process timing of the focal point detection device according to the first embodiment of the present invention.

FIG. 2 shows process timing of the luminance signal generation circuit 10 and the HPF 12. An image pickup signal is output from the imaging device in synchronization with a horizontal synchronizing signal (signal HD of FIG. 2) for one line of pixels among the pixels constituting the light receiving surface of the imaging device, and is input to the luminance signal generation circuit 10. The luminance signal generation circuit 10 generates a luminance signal not for the entirety of the one line of the input image pickup signal, but for a shorter region than the one line (Y generation region of FIG. 2). That is, the luminance signal output from the luminance signal generation circuit 10 corresponds to a part of the light receiving surface of the imaging device.

By making a region for generating the luminance signal smaller than conventionally, it is possible to make an allowance for the processing time of the HPF 12. The HPF 12 is synchronized to clock 2, which is slower than clock 1 supplied to the luminance signal generation circuit 10, and processes the luminance signal for the HPF processing region corresponding to the Y generation region of FIG. 2 until immediately before the luminance signal for the next line is generated. As a result, the HPF 12 can finish processing the luminance signal within a predetermined time. The number of data constituting the HPF processing region of FIG. 2 is the same as the number of data constituting the Y generation region. However, the processing time of the HPF processing region may be longer than the processing time of the Y generation region.

Figure 3:
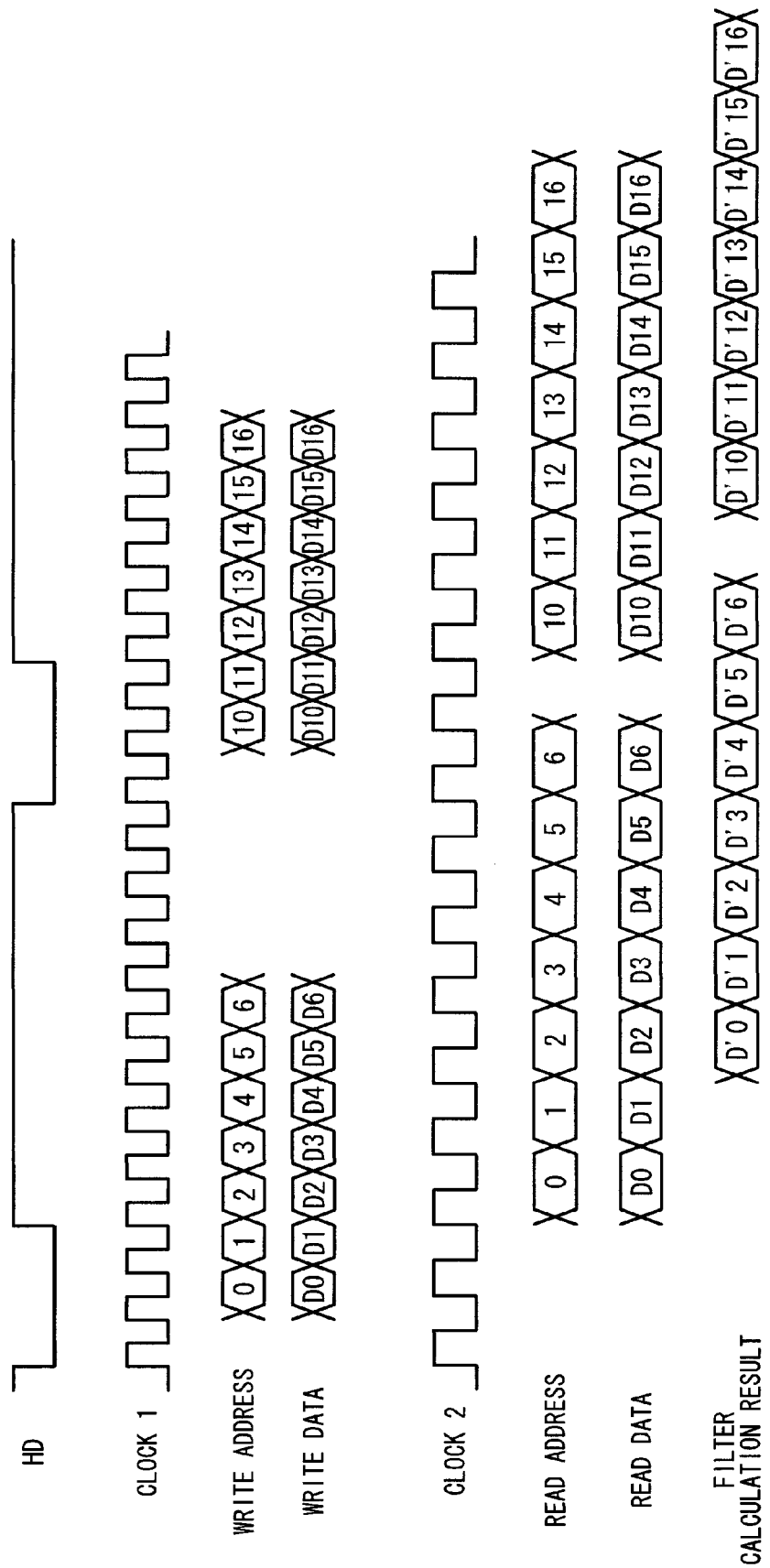
FIG. 3 is a timing chart showing process timing of the focal point detection device according to the first embodiment of the present invention.

FIG. 3 shows the data read and write timings for the SRAM 11 and the processing timing of the HPF 12. To the SRAM 11, address signals for data writing are supplied in synchronization with clock 1, and data is written according to the address signal. Furthermore, to the SRAM 11, address signals for data reading are supplied in synchronization with clock 2, which is slower than clock 1, and data is read according to the address signal. The read data is processed in synchronization with clock 2 by the HPF 12, and output as a filter calculation result.

As described above, according to the present embodiment, in the SRAM 11, the transmission rate of the luminance signal is converted from the transmission rate defined by clock 1, at which the luminance signal is input, to the transmission rate defined by clock 2 which is slower than clock 1. As a result, even in the case where the transmission speed of the luminance signal exceeds the processing speed of the HPF 12, the HPF 12 can perform the HPF processing associated with the detection of the focus state.

<Second Embodiment>

Figure 4:
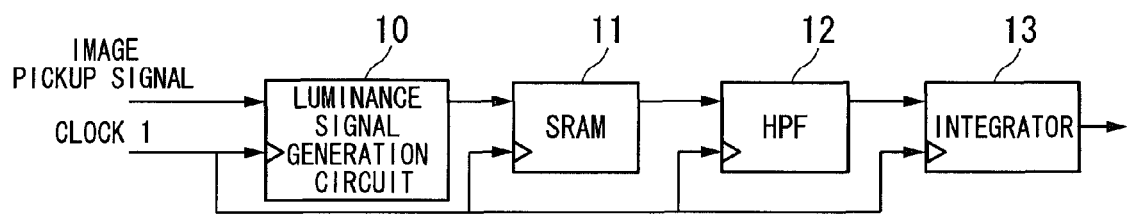
FIG. 4 is a block diagram showing the structure of a focal point detection device according to a second embodiment of the present invention.

Next is a description of a second embodiment of the present invention. FIG. 4 shows the structure of a focal point detection device according to the present embodiment. In the present embodiment, a luminance signal generation circuit 10, a SRAM 11, a HPF 12, and an integrator 13 operate in synchronization with a common clock 1.

Figure 5:
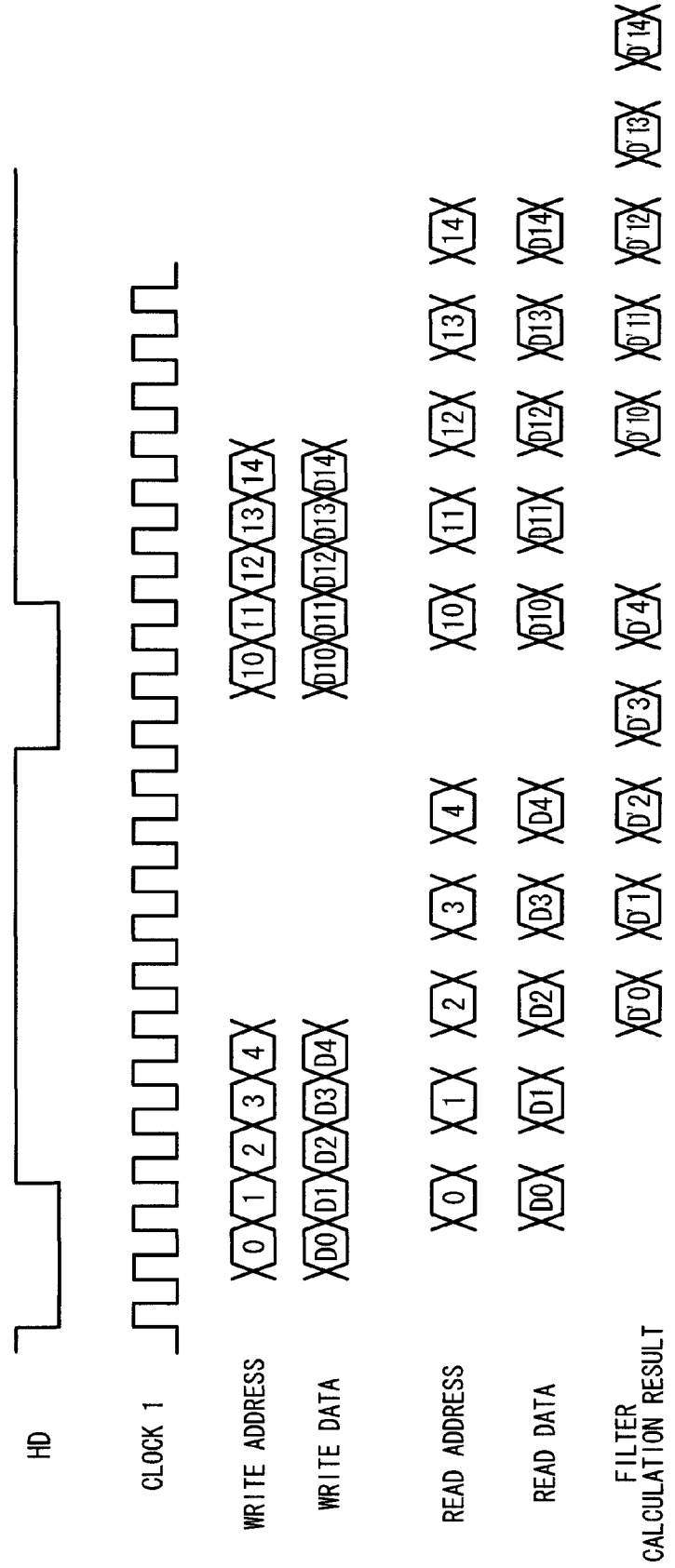
FIG. 5 is a timing chart showing process timing of the focal point detection device according to the second embodiment of the present invention.

FIG. 5 shows the data read and write timings for the SRAM 11 and the process timing of the HPF 12. To the SRAM 11, address signals for data writing are supplied in synchronization with clock 1, and data is written according to the address signal. Furthermore, to the SRAM 11, address signals for data reading are supplied once per two clock cycles of clock 1, and data is read according to the address signal.

Accordingly, the transmission rate of the luminance signal output from the SRAM 11 is lower (1/2) than the transmission rate of the luminance signal input to the SRAM 11. The read data is processed by the HPF 12 in the duration of two clock cycles of clock 1, and output as a filter calculation result. In the present embodiment, the arrangement may be such that data is read from the SRAM 11 once per N clock cycles (where N is an integer greater than or equal to 2), and one item of data is HPF processed in the duration of N clock cycles. As a result, the luminance signal generation circuit 10 generates luminance signals for 1/N lines from the input image pickup signal in units of one line.

As described above, according to the present embodiment, in the SRAM 11, the transmission rate of the luminance signal input at the transmission rate defined by clock 1 is converted into a slower transmission rate. As a result, even in the case where the transmission speed of the luminance signal exceeds the processing speed of the HPF 12, the HPF 12 can perform the HPF processing associated with the detection of the focus state. Furthermore, since a common clock can be supplied to each of the sections, compared with the first embodiment in which two different clocks are supplied, the size of the circuit can be reduced.

<Third Embodiment>

Figure 6:
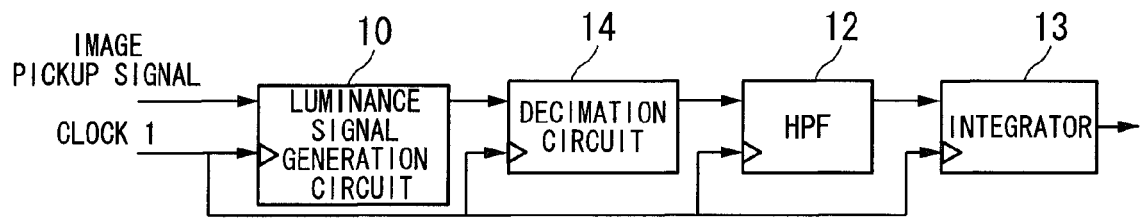
FIG. 6 is a block diagram showing the structure of a focal point detection device according to a third embodiment of the present invention.

Next is a description of a third embodiment of the present invention. FIG. 6 shows the structure of a focal point detection device according to the present embodiment. In the present embodiment, a decimation circuit 14 is provided between the luminance signal generation circuit 10 and the HPF 12. The decimation circuit 14 eliminates a part from the input luminance signal and outputs it.

Figure 7:
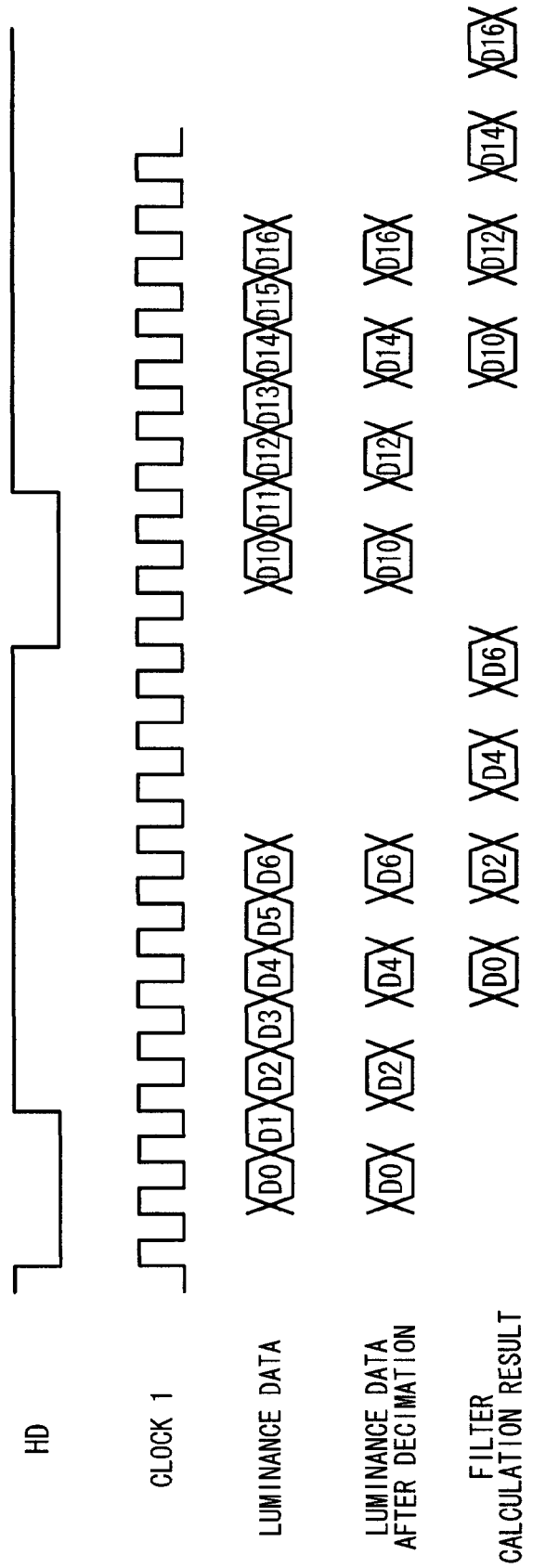
FIG. 7 is a timing chart showing process timing of the focal point detection device according to the third embodiment of the present invention.

FIG. 7 shows the data input and output timings of the decimation circuit 14, and the process timing of the HPF 12. Luminance data is input to the decimation circuit 14 in synchronization with clock 1. The decimation circuit 14 is synchronized to clock 1, and eliminates the luminance data for output at a rate of one pixel out of every two pixels. Accordingly, the transmission rate of the luminance signal output from the decimation circuit 14 is lower (1/2) than the transmission rate of the luminance signal input to the decimation circuit 14.

The read data is processed by the HPF 12 in the duration of two clock cycles of clock 1, and output as a filter calculation result.

As described above, according to the present embodiment, in the decimation circuit 14, the transmission rate of the luminance signal input at the transmission rate defined by clock 1 is converted into a slower transmission rate. As a result, even in the case where the transmission speed of the luminance signal exceeds the processing speed of the HPF 12, the HPF 12 can perform the HPF processing associated with the detection of the focus state. Moreover, since the present embodiment uses a construction in which the luminance signal is eliminated, the luminance signal generation circuit 10 can generate luminance signals over a wider region than that in the first embodiment.

Furthermore, since no SRAM is provided in the present embodiment, the size of the circuit is reduced, and the amount of data that the HPF 12 can process is not limited by the size of the SRAM. In the present embodiment, a discrete decimation circuit 14 is provided. However, the function of the decimation circuit 14 may also be incorporated in the HPF 12.

<Fourth Embodiment>

Figures 8, 9:
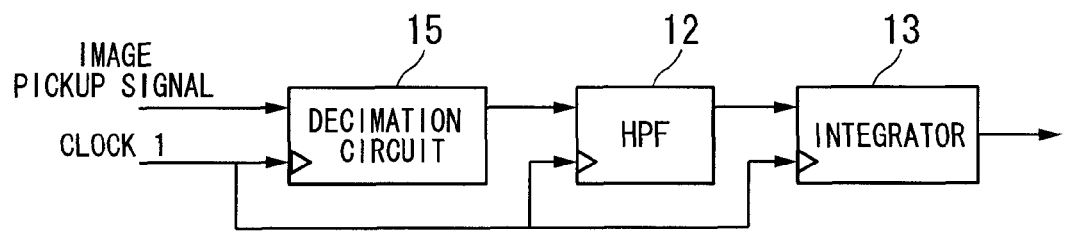
FIG. 8 is a block diagram showing the structure of a focal point detection device according to a fourth embodiment of the present invention.
FIG. 9 is a reference diagram showing a filter arrangement of the imaging device of the fourth embodiment of the present invention.

Next is a description of a fourth embodiment of the present invention. FIG. 8 shows the structure of a focal point detection device according to the present embodiment. The focal point detection device shown in FIG. 8 has a structure in which the luminance signal generation circuit 10 is omitted compared with the focal point detection device shown in FIG. 6. Moreover, a decimation circuit 15 of the present embodiment eliminates a signal corresponding to a predetermined color from an image pickup signal (image signal) having a specific color arrangement and outputs it. Furthermore, an HPF 12 of the present embodiment extracts a predetermined frequency component not from a luminance signal but from a predetermined image pickup signal.

A Bayer filter in which red, blue, and green color filters are arranged in the Bayer arrangement is attached to the light receiving surface of the imaging device. FIG. 9 shows a filter arrangement of the pixels on the light receiving surface of the imaging device. The filter arrangement is the Bayer arrangement in which red (R), blue (B), and green (G) constitute one unit. Among the image pickup signals corresponding to each of the pixels shown in FIG. 9, the image pickup signals (corresponding to Gr and B) corresponding to the pixels in the even number rows are eliminated by the decimation circuit 15.

Figure 10:
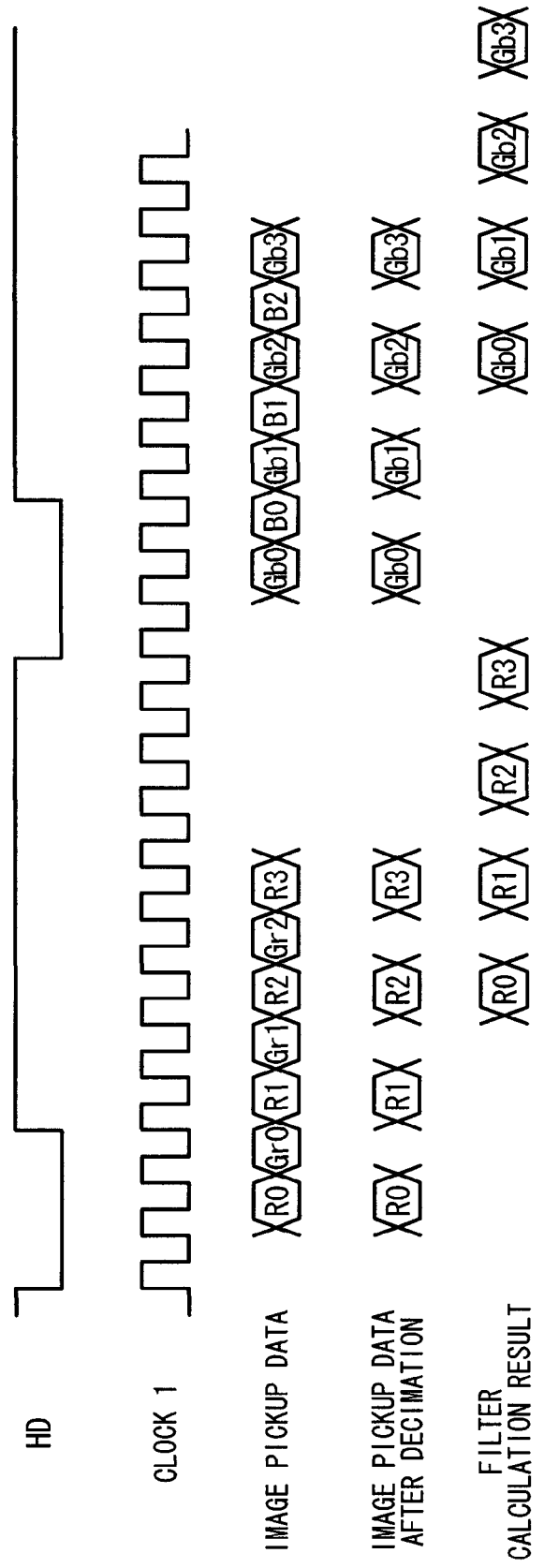
FIG. 10 is a timing chart showing process timing of the focal point detection device according to the fourth embodiment of the present invention.

FIG. 10 shows the data input and output timing of the decimation circuit 15, and the process timing of the HPF 12. The image pickup signal is input to the decimation circuit 15 in synchronization with clock 1. The decimation circuit 15 is synchronized to clock 1, and eliminates the image pickup signal for output at a rate of one pixel out of every two pixels. Accordingly, the transmission rate of the image pickup signal output from the decimation circuit 15 is lower (1/2) than the transmission rate of the image pickup signal input to the decimation circuit 15. The read data is processed by the HPF 12 in the duration of two clock cycles of clock 1, and output as a filter calculation result.

As described above, according to the present embodiment, in the decimation circuit 15, the transmission rate of the luminance signal input at the transmission rate defined by clock 1 is converted into a slower transmission rate. As a result, even in the case where the transmission speed of the luminance signal exceeds the processing speed of the HPF 12, the HPF 12 can perform the HPF processing associated with the detection of the focus state. In the present embodiment, a discrete decimation circuit 15 is provided. However, the function of the decimation circuit 15 may also be incorporated in the HPF 12.

<Fifth Embodiment>

Figure 11:
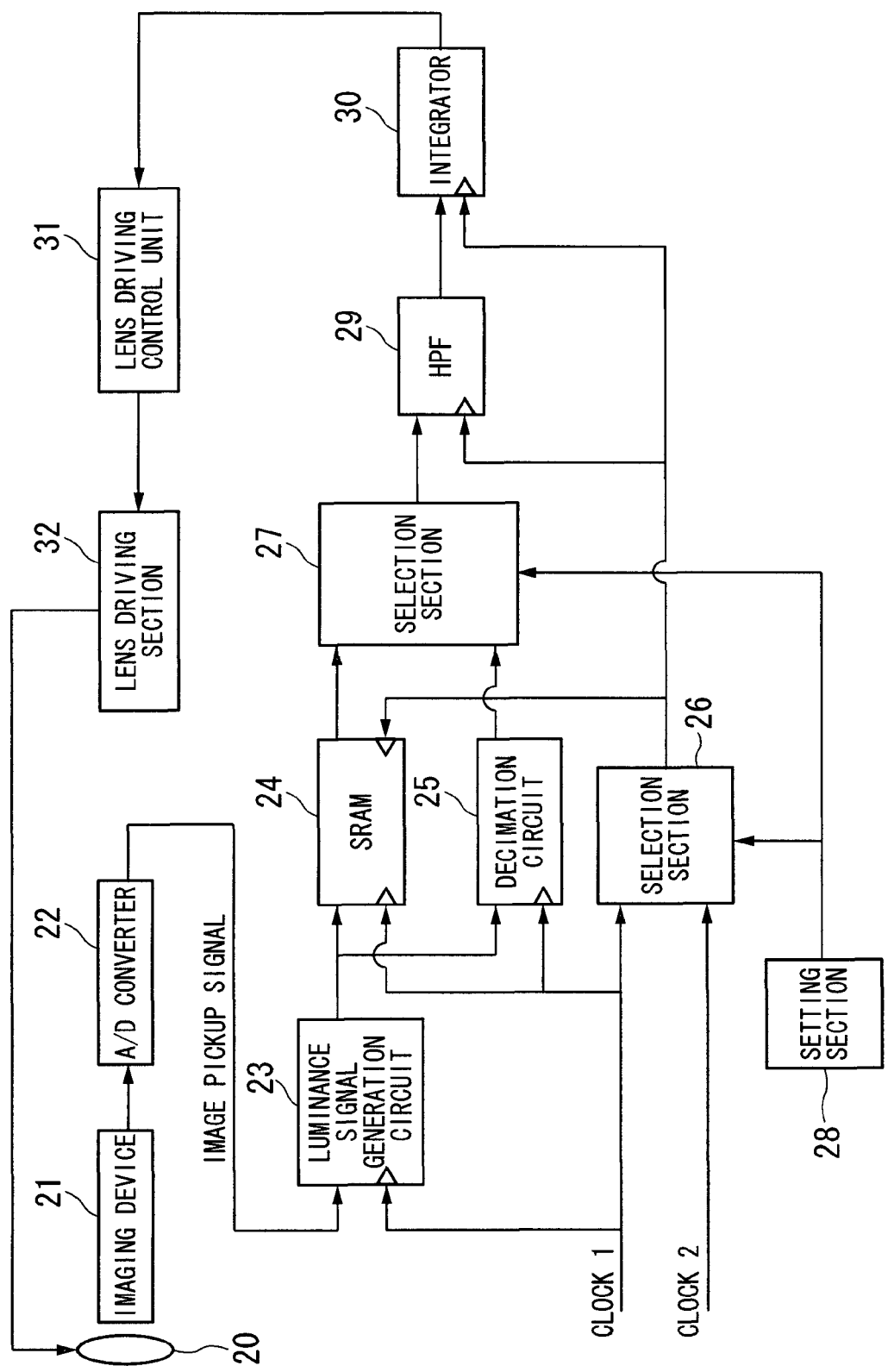
FIG. 11 is a block diagram showing the structure of a camera system according to a fifth embodiment of the present invention.

Next is a description of a fifth embodiment of the present invention. FIG. 11 shows the structure of a camera system according to the present embodiment. As shown in FIG. 11, the camera system is provided with an imaging lens 20, an imaging device 21, an A/D converter 22, a luminance signal generation circuit 23, a SRAM 24, a decimation circuit 25, selection sections 26 and 27, a setting section 28, an HPF 29, an integrator 30, a lens driving control unit 31, and a lens driving section 32.

The imaging lens 20 images a subject image on the light receiving surface of the imaging device 21. The imaging device 21 photoelectrically converts the subject image imaged on the light receiving surface, and outputs an image pickup signal. The A/D converter 22 converts the analog image pickup signal into a digital image pickup signal. The luminance signal generation circuit 23 generates a luminance signal from the input image pickup signal in synchronization with clock 1, and outputs it. The SRAM 24 temporarily stores the input luminance signal. The decimation circuit 25 eliminates a part from the input luminance signal, and outputs it.

The selection section 26 selects either of the input clock 1 or clock 2 and outputs it. Clock 2 is slower than clock 1 (in other words, clock 1 is faster than clock 2). The selection section 27 selects the output of either one of the SRAM 24 and the decimation section 25, and outputs it. The setting section 28 performs setting for the selection sections 26 and 27.

The HPF 29 extracts a predetermined frequency component from the input signal and outputs it. The integrator 30 integrates a signal of the frequency component extracted by the HPF 29, and calculates an evaluation value of the focus state of the imaging lens 20.

The lens driving control unit 31 generates a lens driving signal for moving the imaging lens 20 to a position where it becomes focused, based on the evaluation value output from the integrator 30, and outputs it to the lens driving section 32. The lens driving section 32 drives the imaging lens 20 in the optical axis direction according to the lens driving signal from the lens driving control unit 31. In the present embodiment, known structures such as a signal processing circuit and the like, which perform signal processing such as gamma correction for a digital image pickup signal processed in the A/D converter 22, are omitted from the illustration.

In the camera system according to the present embodiment, it is possible to use the focal point detection device (referred to hereunder as a first focal point detection device) according to the first embodiment, and the focal point detection device (referred to hereunder as a second focal point detection device) according to the third embodiment, interchangeably. In the case where the first focal point detection device is used, it is possible to obtain a highly accurate evaluation value based on a signal associated with a subject image in a comparatively small region of the light receiving surface of the imaging device 21. Furthermore, in the case where the second focal point detection device is used, it is possible to obtain an evaluation value in the case of focusing on the whole image based on a signal associated with a subject image in a comparatively large region of the light receiving surface of the imaging device 21.

For example, in the case where a still picture is taken, the first focal point detection device may be selected. In this case, according to the setting of the setting section 28, the selection section 26 selects clock 2, and the selection section 27 selects the output from the SRAM 24. As a result, it is possible to construct a camera system including the first focal point detection device, so that it is possible to focus accurately on the subject that a photographer wishes to take.

Moreover, in the case where a moving image of a subject is displayed for check, the second focal point detection device may be selected.

In this case, according to the setting of the setting section 28, the selection section 26 selects clock 1, and the selection section 27 selects the output from the decimation circuit 25. As a result, it is possible to construct a camera system including the second focal point detection device, so that it is possible to focus on the whole image.

As described above, according to the present embodiment, by constructing a camera system such that it is possible to select either one of the two focal point detection devices, it is possible to generate an evaluation value corresponding to the photographic conditions, and focus the imaging lens. In the present embodiment, the construction is such that the focal point detection device according to the first embodiment and the focal point detection device according to the third embodiment are interchanged. However, the arrangement may also be such that any one of two or more focal point detection devices is selected, and focal point detection devices according to any of the above-described embodiments may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. According to the present invention, by converting the transmission rate of the image signal from a first transmission rate at which the image signal is input to a second transmission rate that is slower than the first transmission rate, or by outputting a second image signal in which a part is eliminated from the first image signal, it is possible to perform the processing associated with the detection of a focus state even in the case where the transmission speed of the image signal exceeds the processing speed of the filter.

What is claimed is:

1. A camera system comprising:
   an imaging lens which images a subject image on a light receiving surface of an imaging device;
   a luminance signal generation section which generates a luminance signal output at a first transmission rate, from an image pickup signal input at the first transmission rate, the image pickup signal associated with the subject image imaged on a partial region of the light receiving surface of the imaging device via the imaging lens;
   a first focal point detection device comprising a rate conversion section which converts a transmission rate of the luminance signal, such that the luminance signal input to the rate conversion section at the first transmission rate is output from the rate conversion section at a second transmission rate that is lower than the first transmission rate;
   a second focal point detection device comprising a decimation section that outputs a decimated luminance signal in which a part from the luminance signal is eliminated;
   a selection section which selects either one of first or second two focal point detection devices;
   a filter which extracts a frequency component from the luminance signal output at the second transmission rate from the rate conversion section, or extracts the frequency component from the decimated luminance signal output from the decimation section, based on the selection of the selection section;
   an evaluation value calculation section which calculates an evaluation value of a focus state of the imaging lens, based on a signal of the frequency component that is extracted by the filter; and
   a lens driving section which drives the imaging lens so as to adjust a focal position, based on the evaluation value output from the selected focal point detection device.

* * * * *